Figures 1, 2:
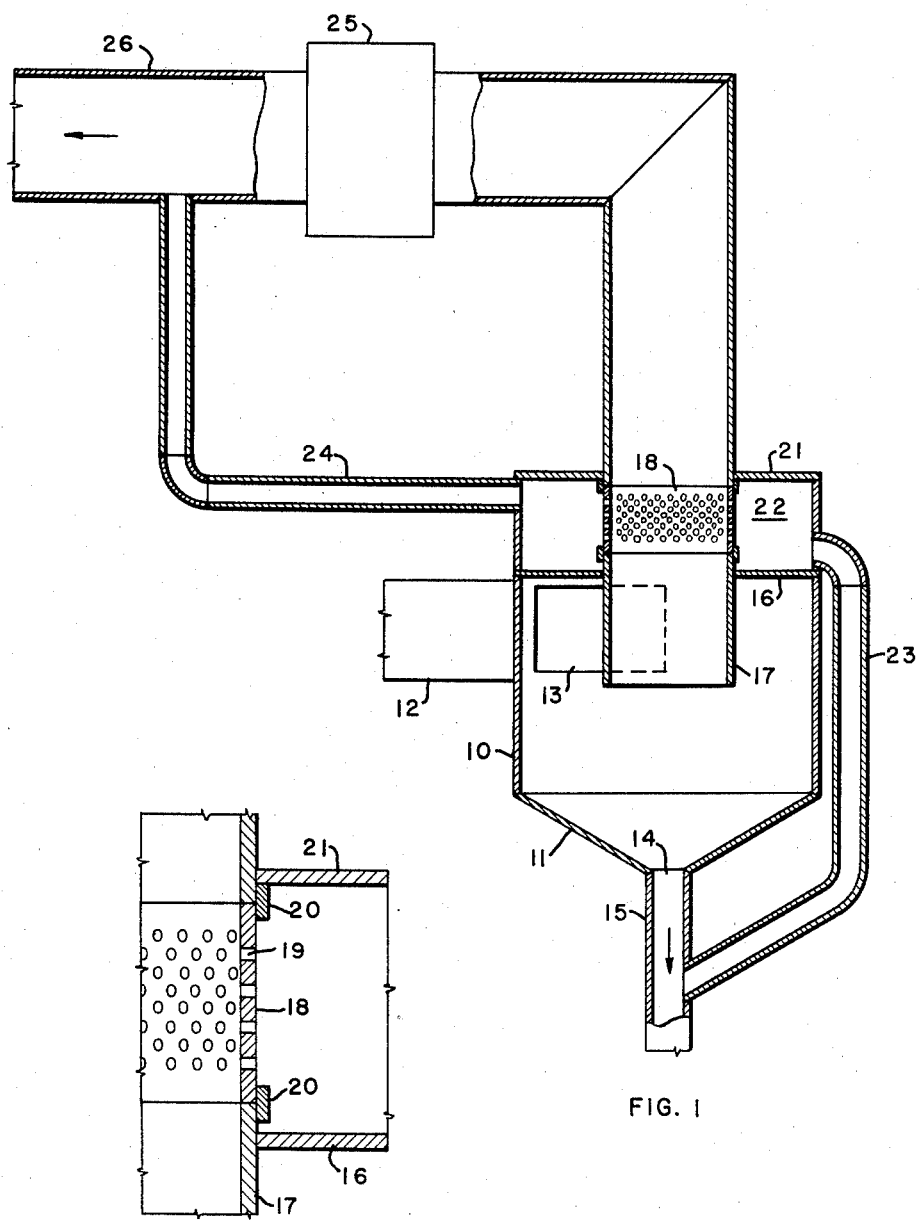

Oct. 28, 1958 J. J. VAN ROSSUM 2,857,980
GAS–LIQUID SEPARATOR WITH SIEVE PLATE
Filed Nov. 28, 1955

INVENTOR:
JACOBUS J. VAN ROSSUM
BY: *Oswald H. Wilmore*
HIS ATTORNEY

United States Patent Office 2,857,980
Patented Oct. 28, 1958

2,857,980

GAS-LIQUID SEPARATOR WITH SIEVE PLATE

Jacobus J. van Rossum, Delft, Netherlands, assignor to Shell Development Company, New York, N. Y., a corporation of Delaware Application November 28, 1955, Serial No. 549,523

Claims priority, application Netherlands November 30, 1954

5 Claims. (Cl. 183—83)

The invention relates to apparatus for effecting separation between gas and liquid ("gas" being used generically to include vapor) including an enclosed flow zone for the gas which is bounded by a wall on which a liquid film is formed by creep of liquid from another part of the separator and/or by deposition of liquid from the gas as a result of rotational movement of the gas or by other gas turbulence, wherein said liquid film is separated from the gas by passage through a portion of said wall into a collecting chamber which may be maintained at a reduced pressure. It finds especial application in the gas outlet (also known as overflow outlet) of stationary centrifugal separators wherein liquid drops are separated centrifugally from a gas which is charged tangentially into a centrifugation chamber, but is also applicable to other devices. This invention is a modification of the separator described by William J. D. van Dijck in his patent application Serial No. 518,177, filed in the United States June 27, 1955.

A stationary centrifugal separator of the type herein considered includes an enclosed centrifugation chamber, usually shaped as a surface of revolution, having one or more tangential inlets near one axial end for admitting the gas, burdened with liquid, in a direction to cause circumferential or vortical motion thereof, an overflow outlet for discharging the dried gas from the vicinity of the chamber axis, and an underflow outlet for discharging the liquid, which collects near the radially outer part of the chamber; the terms overflow and underflow relate the outlets to the density of the phase discharged and do not denote relative elevations of the outlets. Such separators are sometimes classified as cyclones and whirl chambers, the invention being applicable to both types: In a cyclone the enclosing wall usually includes a tubular part, e. g., a cylinder, at the end of the tangential inlet, the overflow outlet is situated near said end and usually includes a discharge tube that extends axially into the centrifugation chamber for a part of the length thereof to form a vortex-finder, and the underflow outlet is at the opposite end, e. g., at the apex when the chamber is upright and closed at the bottom by downwardly convergent closure, or at the periphery when the enclosing wall is mainly cylindrical and/or when the axis is horizontal. In the whirl chamber both the overflow and underflow outlets are situated at the same end, which may be remote from the tangential inlet when the chamber is axially elongated; the overflow outlet is a central opening in an end closure of the chamber and the underflow outlet is situated either near or at the periphery or is arranged coaxially with the overflow opening.

From the foregoing description it is clear that the cyclone operates on the countercurrent principle and the whirl chamber on the parallel-flow principle, but this does not constitute any essential difference as regards the invention.

It is found in practice that some liquid is discharged through the overflow outlet together with the so-called dry gas. Such liquid may occur as dispersed droplets that were initially present in the feed stream but were not separated in the centrifugation chamber because of their small size, due to the fact that such devices are more effective for separating larger drops. Also, such liquid may be re-entrained from a confining wall of the apparatus, such as the inner wall or the end closure of the centrifugation chamber, or the inner or outer wall of the overflow outlet duct, it having been observed that liquid flows or creeps as a film along the abovementioned walls into the overflow outlet, wherein the film is disrupted and the liquid is entrained by the whirling gas. Such liquid may also be swept along the outlet duct without actual entrainment. It is evident that the flow of liquid through the overflow outlet, by whatever method, reduces the separating efficiency of the separator, and that the operating efficiency could be improved by preventing or reducing such flow.

According to a publication by Ter Linden in Chemie-Ingenieur-Technik (Weinheim/Bergr.), vol. 25 (1953), page 330, the creep of liquid toward the overflow outlet of a cyclone having a vortex-finder is limited considerably by mounting a cylindrical baffle on the end closure concentrically about and in spaced relation to the vortex-finder. This, however, does not completely prevent creep and does not influence the flow of fine drops that were not separated from the gas in the main centrifugation chamber.

According to other proposals the wall of the overflow outlet duct is provided with gaps or slots establishing communication with an auxiliary liquid-collecting chamber which is maintained under reduced pressure to induce liquid creeping along the duct wall or deposited thereon by the rotation of the effluent gas to enter the collecting chamber. Arrangments of this type are suggested in U. S. Patents Nos. 1,231,371; 1,408,693 and 2,425,588, and French Patent No. 1,035,313, but result in the passage of an excessive amount of gas together with the liquid into the collecting chamber where it must be separated from the liquid and from which it must be withdrawn against an adverse pressure gradient; these circumstances present added difficulties.

Entry of appreciable amounts of gas into the collecting chamber is avoided by the construction according to the above-mentioned Van Dijck application, Serial No. 518,177 by providing a porous wall in the overflow outlet duct, e. g., one having pores smaller than 0.1 mm. in size, whereby the liquid film on the porous wall is for the main part unbroken by the suction applied to the collecting chamber. It has now been found that in the separation of viscous drops, particularly those which are more viscous than water, from gases the porous wall becomes clogged to such an extent that the flow resistance in the porous material increases considerably, leading to difficulties. Thus, a high degree of suction is sometimes required, and the porous material may become fouled, with the result that the pores ultimately become closed.

It is the main object of the invention to provide an improved apparatus for separating liquid from gas wherein the liquid occurs on the wall of an enclosed flow zone for gas and suction is applied to draw the liquid into an auxiliary collecting chamber, the apparatus being so constructed that the flow of gas together with liquid into the collecting chamber is restricted to a reasonably small amount while the difficulties of clogging of the pores noted in the preceding paragraph are avoided.

A further object is to improve the operating efficiency of stationary centrifugal separators of the type indicated by providing the overflow outlet with an improved auxiliary liquid collector that operates only a moderate entry of gas into the liquid collector.

According to the invention it was found that liquid occurring as a film on the wall enclosing a gas-flow zone can be drawn off without incurring the difficulties noted above by forming at least a part of said wall as a sieve plate which is disposed between said flow zone and a liquid-collecting chamber which is maintained at a pressure sufficiently low to permit liquid to flow through the sieve plate. The liquid collected in the collecting chamber can, after separation from the minor amount of gas that also flows through the sieve plate, be commingled with liquid which is discharged from another part of the separator.

By "sieve plate" is understood a perforated plate the openings of which are substantially alike as regards flow resistance and have diameters of the same order of size as the plate thickness. When holes are not circular in cross section the diameter mentioned is taken as the equivalent diameter, i. e., four times the hydraulic radius. The holes may, for example, have diameters from about 0.2 to 5 mm. and the plate may have a thickness within or above the same range. The number of holes is usually such that the open area is between 6% and 60% of the plate area.

The liquid occurs on the sieve plate because of any or by a combination of the causes considered above, e. g., by deposition of entrained liquid from the gas as a result of turbulence in the gas or rotational, vortical flow thereof which leads to centrifugal forces, or by wall creep. As applied, for example, to the overflow outlet duct of a stationary centrifugal separator, a part of the overflow duct may be formed of such a sieve plate. The sieve plate is advantageously arranged to form an extension of the imperforate part of the said duct, to remove liquid from the outside and/or from the inside thereof, depending upon circumstances, as illustrated in the said Van Dijck patent application. Suction can be applied to the liquid-collecting chamber by connecting it to any suitable low-pressure point, such as the suction intake of a blower, a low-pressure region of the separator, or a low-pressure unit of the plant of which the separator is another unit.

The construction according to the invention is very simple and requires but a slight pressure difference across the sieve plate for causing liquid flow; yet only a small amount of gas flows through the sieve plate, which constitutes a considerable advantage in the operation of the separator as a whole, since only a small gas stream need be handled separately. By a correct choice of the location of the sieve plate, in particular in a part of the gas-effluent duct of a centrifugal separator close to the centrifugation chamber, in which part the gases are still rotating with a high velocity, the centrifugal forces set up by the rotating gases also to help to force the liquid through the sieve plate and practically no suction is required to effect liquid flow.

The invention will be further described with reference to the accompanying drawing forming a part of this specification and illustrating a preferred embodiment, wherein:

Figure 1 is a vertical sectional view through a cyclone provided with a sieve plate and an auxiliary liquid collector on the overflow outlet duct, and Figure 2 is an enlarged detail view of the overflow duct indicated in Figure 1.

Referring to the drawings, there is shown a cyclone having a centrifugation chamber of conventional shape, enclosed by an outer wall including an upper cylindrical part 10 and a lower, frusto-conical part 11, both formed as surfaces of revolution about a vertical axis. An inlet duct 12 is disposed tangentially to the upper part and opens into the centrifugation chamber through an inlet opening 13, whereby an entering feed stream of gas, burdened with liquid, forms a vortex from which the liquid is separated against the outer wall by centrifugal force. The separated liquid for the greater part flows downward and is discharged through a central underflow outlet opening 14 and a discharge duct 15. The cyclone further includes a top closure 16 having a central opening through which extends an overflow discharge duct 17. The duct preferably extends to a level below the lower edge of the opening 13 to form a vortex-finder which leads off the dried gas from the core of the vortex.

In the particular embodiment shown, the duct 17 is provided with a sieve plate which is situated to remove liquid from the inner surface of the duct. To this end, an annular sieve plate 18 having small perforations 19 throughout the periphery thereof is fitted in an annular gap in the duct at a level above the closure 16 by means of collars 20. A casing 21 surrounds the sieve plate to enclose a liquid-collecting chamber 22 of sufficient size to permit gravity separation of gas from liquid therein. A liquid-drawoff pipe 23 is connected to the bottom of the chamber 22 and discharges to any desired discharge point, such as the duct 15. The top of the chamber 22 is connected by a gas-drawoff pipe 24 to any suitable low-pressure point. Thus, when the gas is at superatmospheric pressure, it may be passed from the duct 17 to any apparatus 25 which is a unit of the plant and wherein a pressure drop occurs, whereby the pressure in the discharge pipe 26 is lower; the pipe 24 is then conveniently connected to the pipe 26, as shown.

In operation, liquid entering the duct 17 by creep as a film successively along the closure 16, the outside of the duct 17, and up along the inner surface, and/or liquid deposited on the inner surface of the duct 17 from the gas, reaches the sieve plate 18 and flows out through the openings 19 into the collecting chamber 22. Flow occurs due to the suction effect of the reduced pressure in the collecting chamber, aided by the centrifugal forces within the duct 17. A small amount of gas enters the chamber 22 due to this suction, but the amount thereof is minimized by using only a small suction. This gas is discharged through the pipe 24 while the liquid is discharged through the pipe 23 and united with the liquid in the duct 15.

*Example I*

A test was carried out with a cyclone constructed essentially as shown in the drawing and having a centrifugation chamber 10 with a diameter of 42.5 cm. and an overflow duct 17 with a diameter of 17.5 cm. In the first run, wherein the overflow duct was continuously impervious, air charged with 22.7 g. atomized spindle oil per cu. meter of air was admitted to the centrifugation chamber at the rate of 1000 cu. meters per hour. 96.9% of the oil was discharged throught the underflow while 3.1% was entrained in the gas discharged through the overflow; experiments indicated that the entrained oil consisted of about 1.8% of oil that had travelled as a film along the walls and 1.3% of mist carried into the duct by the air.

For the second run the overflow duct was modified by providing an annular sieve plate with an internal diameter equal to that of the overflow duct, an effective height of 4 cm., a thickness of 0.6 mm., and containing circular holes 0.4 mm. in diameter spaced uniformly with a density of 80 holes per sq. cm. The effective open area of the sieve plate was, therefore, about 10%. It was found that when the pressure in the collecting chamber was below that in the duct by 167 mm. of water, substantially all of the oil that travelled as a film was drawn through the sieve plate, and the amount of oil leaving with the gas was reduced to 1.3%. The amount of air simultaneously passed through the sieve plate was approximately 40 cubic meters per hour, i. e., approximately 4% of the total amount of air passed through the separator.

*Example II*

The advantage of a sieve plate over slotted plates as previously proposed are evident from the following comparative tests. When using a tubular sieve plate about 1 mm. thick with circular openings 2 mm. in diameter providing a free area of about 25%, sufficient liquid to reduce the liquid content of the gas stream to 1% of the feed liquid could be sucked through the plate while simultaneously drawing off only about 0.1% of the gas. Corresponding experiments were carried out using a tubular plate of the same size and thickness but having slits arranged perpendicular to the direction of gas flow, each individual slit measuring 9.5 mm. in length and having a width of 1 mm. and providing about 25% free area. Again, sufficient liquid to reduce the liquid content of the gas stream to 1% of the feed liquid could be sucked through the plate, but the quantity of gas drawn into the liquid-collecting chamber was ten times as great as with the sieve plate. When the slits were oriented with their long dimensions parallel to the main gas stream a much greater quantity of gas had to be sucked through the slits in order to attain the same liquid drawoff.

*Example III*

Further tests were performed similar to those described in Example II, but without applying a differential pressure across the sieve or slotted plate. In these experiments no gas was drawn through the plates. When using a sieve plate with circular openings of 2 to 3 mm. in diameter, about 80% of the liquid present in the tube passed through the openings; with slits no such yield could be attained.

I claim as my invention:

1. A gas-liquid separator including a wall bounding a gas flow zone, a portion of said wall being formed as a sieve plate having a thickness between about 1 and 5 mm. and orbiculate openings therethrough which are substantially alike as regards flow resistance, said openings having effective diameters which are of the same order of size as the plate thickness and between about 0.2 and 5 mm.; means for admitting gas and liquid into said flow zone at one side of said wall; means for discharging said gas from said flow zone on the same side of said wall; a wall structure defining a liquid-collecting chamber at the side of said sieve plate remote from said flow zone; and means for discharging liquid from said liquid-collecting chamber.

2. A gas-liquid separator according to claim 1 wherein said openings in the sieve plate occupy between about 6% and 60% of the area thereof.

3. A gas-liquid separator including an enclosing wall defining a chamber and shaped substantially as a surface of revolution; means for admitting a gas burdened with liquid with a rotary motion into said chamber to form a vortex therein; a gas-discharge duct communicating with the central part of said chamber, a portion of said duct which is exposed to said gas being formed as a sieve plate having a thickness between about 1 and 5 mm. and orbiculate openings therethrough which are substantially alike as regards flow resistance, said openings having effective diameters which are of the same order of size as the plate thickness and between about 0.2 and 5 mm.; a wall structure defining a liquid-collecting chamber at the side of said sieve plate remote from that exposed to said gas; and means for discharging liquid from said liquid-collecting chamber.

4. A gas-liquid separator according to claim 3 wherein said first-mentioned chamber is the centrifugation chamber of a stationary centrifugal separator and is provided with an underflow outlet for liquid and the said outlet duct constitutes the overflow outlet of the chamber.

5. A cyclone including an enclosing wall shaped substantially as a surface of revolution enclosing a centrifugation chamber and having a tangential inlet for gas burdened with liquid; an underflow outlet for liquid; an overflow outlet for gas including a vortex-finder tube extending centrally into said centrifugation chamber, a portion of said tube which is exposed to gas leaving said chamber being formed as a sieve plate having a thickness between about 1 and 5 mm. and orbiculate openings therethrough which are substantially alike as regards flow resistance, said openings having effective diameters which are of the same order of size as the plate thickness and between about 0.2 and 5 mm.; a wall structure defining a liquid-collecting chamber at the side of said sieve plate remote from that exposed to said gas; and means for applying suction to said liquid-collecting chamber.

References Cited in the file of this patent

UNITED STATES PATENTS

| 306,136 | Crosby | Oct. 7, 1884 |
|---|---|---|
| 2,138,143 | Dodge | Nov. 29, 1938 |
| 2,425,588 | Alexander | Aug. 12, 1947 |
| 2,661,076 | Walker | Dec. 1, 1953 |

FOREIGN PATENTS

| 301,177 | Great Britain | Nov. 29, 1928 |
|---|---|---|
| 328,122 | Great Britain | Apr. 24, 1930 |
| 1,035,313 | France | Apr. 15, 1953 |